(12) United States Patent
Pong et al.

(10) Patent No.: US 8,412,486 B2
(45) Date of Patent: Apr. 2, 2013

(54) POWER CONVERTER REMAINING LIFE ESTIMATION

(75) Inventors: Man Hay Pong, Apelichau (HK); Hon Man Pang, New Territories (HK)

(73) Assignee: The University of Hong Kong, Hong Kong (HK)

( * ) Notice: Subject to any disclaimer, the term of this patent is extended or adjusted under 35 U.S.C. 154(b) by 541 days.

(21) Appl. No.: 12/622,003

(22) Filed: Nov. 19, 2009

(65) Prior Publication Data

US 2010/0125435 A1 May 20, 2010

Related U.S. Application Data

(60) Provisional application No. 61/116,507, filed on Nov. 20, 2008.

(51) Int. Cl.
*G06F 11/30* (2006.01)
(52) U.S. Cl. .......... 702/182; 702/58; 702/184; 323/282; 323/283; 342/53; 342/165
(58) Field of Classification Search ................ 702/182; 323/300, 268, 282, 283, 284; 341/53, 165
See application file for complete search history.

(56) References Cited

U.S. PATENT DOCUMENTS

| | | | |
|---|---|---|---|
| 5,481,451 A * | 1/1996 | Kuwahara | 363/37 |
| 6,671,654 B1 | 12/2003 | Forth et al. | |
| 6,801,028 B2 * | 10/2004 | Kernahan et al. | 323/283 |
| 6,801,146 B2 * | 10/2004 | Kernahan et al. | 341/122 |
| 6,819,011 B2 * | 11/2004 | Kernahan et al. | 307/35 |
| 6,825,644 B2 * | 11/2004 | Kernahan et al. | 323/283 |
| 6,841,983 B2 * | 1/2005 | Thomas | 323/322 |
| 6,885,568 B2 * | 4/2005 | Kernahan et al. | 363/97 |
| 6,894,463 B2 * | 5/2005 | Kernahan | 323/267 |
| 6,906,500 B2 * | 6/2005 | Kernahan | 323/225 |
| 6,906,502 B2 * | 6/2005 | Kernahan et al. | 323/282 |
| 6,911,809 B2 * | 6/2005 | Kernahan | 323/283 |
| 6,912,139 B2 * | 6/2005 | Kernahan et al. | 363/41 |
| 6,917,188 B2 * | 7/2005 | Kernahan | 323/282 |
| 6,946,753 B2 * | 9/2005 | Kernahan et al. | 307/151 |
| 6,965,200 B2 * | 11/2005 | Kimura et al. | 313/582 |
| 6,975,525 B2 * | 12/2005 | Kernahan | 363/98 |
| 7,002,328 B2 * | 2/2006 | Kernahan et al. | 323/283 |
| 7,019,506 B2 * | 3/2006 | Kernahan | 323/284 |
| 7,092,265 B2 * | 8/2006 | Kernahan | 363/65 |
| 7,095,220 B2 * | 8/2006 | Kernahan | 323/300 |
| 7,114,098 B2 | 9/2006 | Hammond | |
| 7,157,889 B2 * | 1/2007 | Kernahan et al. | 323/268 |
| 7,365,661 B2 * | 4/2008 | Thomas | 341/117 |
| 7,719,808 B2 * | 5/2010 | Phadke et al. | 361/79 |
| 7,990,122 B2 * | 8/2011 | Sase et al. | 323/283 |
| 2005/0017702 A1 * | 1/2005 | Kernahan et al. | 323/282 |
| 2005/0156644 A1 * | 7/2005 | Karnahan et al. | 327/218 |
| 2005/0162144 A1 * | 7/2005 | Kernahan | 323/300 |
| 2006/0176186 A1 | 8/2006 | Larson et al. | |
| 2006/0279970 A1 * | 12/2006 | Kernahan | 363/65 |
| 2007/0150236 A1 | 6/2007 | Warizaya | |

* cited by examiner

*Primary Examiner* — Carol Tsai
(74) *Attorney, Agent, or Firm* — Berkeley Law & Technology Group, LLP (57) ABSTRACT

Subject matter disclosed herein may relate to monitoring and/or estimating remaining life for a power converter.

29 Claims, 10 Drawing Sheets

POWER CONVERTER REMAINING LIFE ESTIMATION

This application claims priority from U.S. Provisional Application Ser. No. 61/116,507, filed Nov. 20, 2008, and entitled "Power Converter Remaining Life Estimation."

BACKGROUND

1. Field

Subject matter disclosed herein may relate to monitoring and/or estimating remaining life for a power converter.

2. Information

Power converters are important components of a very wide range of electronic devices, and reliable operation of such power converters may be of particular importance in a vast array of electronic devices such as, for example, medical, communication, and/or computing devices. In some situations, such electronic devices may be utilized in critical applications where it may be advantageous to avoid sudden failure of the power converter and/or to be able to schedule maintenance or replacement of the power supply before failure.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized. Furthermore, structural or logical changes may be made without departing from the scope of claimed subject matter. It should also be noted that directions or references, for example, up, down, top, bottom, and so on, may be used to facilitate discussion of the drawings and are not intended to restrict the application of claimed subject matter. Therefore, the following detailed description is not to be taken to limit the scope of claimed subject matter or their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As discussed above, power converters are important components of a very wide range of electronic devices, and reliable operation of such power converters may be of particular importance in a vast array of electronic devices such as, for example, medical, communication, and/or computing devices which, in some situations, may be utilized in critical applications where it may be advantageous to avoid sudden failure of the power converter and/or to be able to schedule maintenance or replacement of the power supply before failure.

In general, electronic components have a limited life expectancy. It may prove impractical to design and/or manufacture a power converter that will never fail. To extend life expectancy, one approach might be to use expensive components, and/or to over-design the converter for a given application to build in extra life expectancy. However, such an approach may be impractical from the perspectives of size, cost, and/or ease of manufacture. For example, one may over-design a power converter for a notebook computer or similar electronic device in an effort to provide extended power converter life, but such a converter may greatly increase the cost of the electronic device, and the power converter would still fail at some point, likely without warning.

In order to have reliable operation, a focus may be placed on a correct estimate of the remaining life of the power converter. This may allow scheduled maintenance and/or replacement of power converters that are near the end of their lives, and perhaps avoid sudden disruption of service. Rather than using expensive components to extend the product lifetime, it may be advantageous to focus on more accurate remaining life estimation to allow for scheduled replacement and/or maintenance of a power converter before failure.

At present, it is the responsibility of the design engineer to make sure a power converter he/she designed has the reliability required within its stated working life. However, the estimation that can be made is often far from the truth. This is because the remaining life estimation is based on an assumed operating condition, while the real life time may vary widely, perhaps as much as five to ten times, with different environment and aging. This open loop estimation method may lead to over-design or inadequate design.

Electronic component lifetime may vary greatly depending on its working environment. Accurate remaining life estimation may benefit from accurate information related to the operating environment.

A real-time monitoring system may relatively correctly estimate and report product reliability. This may be similar in some respects to real time prediction of battery remaining capacity in many battery operated products. Another example real time reporting system is the power distribution system as disclosed by Forth in U.S. Pat. No. 6,671,654. A similar method has been found in a battery life estimation system as recorded by Tsujikawa. Hammond, in his U.S. Pat. No. 7,114,098, discloses a system which monitors a power supply system with a plurality of power supplies. The system reports critical state of the power supplies to a computer network. There is no remaining life estimation method, but rather a failure alarm system is disclosed.

Among the many components that may be implemented in a power converter, the electrolytic capacitor may be among the components with the shortest life expectancy. Its failure rate is typically several times of other electronic components. Larson, in US Publication 2006/0176186, discloses a system that monitors the state of a cooling fan on the assumption that it is the critical component. However, not all power converters incorporate a cooling fan. On the other hand, deterioration of a cooling fan may cause temperature to rise. Temperature may be a good indicator, rather than monitoring the fan.

In a power converter, for example, two operating parameters may affect the reliability of an electrolytic capacitor. The first parameter is temperature. The second parameter is the ripple current through the capacitor. Warizaya, in U.S. Publication 2007/0150236, discloses a system to monitor the voltage, current and temperature of capacitors in a power supply, although the main theme of this system is not the capacitor but the system cooling fan. However, capacitor current detection by sensors is not desirable in practice because this impairs proper operation of the power supply and produces power loss. Moreover, sensors may be too expensive for mass produced products and Warizaya's monitoring system is limited to large systems in which cost is not a major concern.

Embodiments described herein may comprise a real-time remaining life estimation apparatus for power converters. Power converter life may be determined at least in part by an electrolytic capacitor. Electrolytic capacitor life may be affected by its ripple current. It may not be practical to use sensors to measure capacitor current. Embodiments disclosed herein may comprise a capacitor current estimation apparatus and techniques which may employ no direct capacitor current measurement. Embodiments may comprise a current mode control power converter in which a semiconductor switching waveform is available in the power converter controller. Embodiments may further comprise a microprocessor which may estimate capacitor currents with a knowledge of the power converter circuit topology, and the estimated remaining life of the power converter may be computed.

One or more embodiments disclosed herein may also comprise a repetitive signal measurement apparatus and/or technique which may allow a noisy, repetitive signal to be captured and digitized by a low cost sample and hold circuit and an analog to digital converter.

One or more embodiments disclosed herein may comprise a simple way to communicate remaining life estimation information. The estimated power converter remaining life may be expressed as a value that may represent the amount of remaining life. The value may be represented by a duty cycle of a pulse train for an embodiment. The frequency of the pulse train may convey additional power converter information, such as, for example, temperature.

A potential advantage of one or more example embodiments may be the estimation of power converter capacitor current without a sensor installed at the capacitor.

Another potential advantage of one or more example embodiments may be an ability to be readily integrated into popular Pulse Width Modulation (PWM) controllers.

In an embodiment, an apparatus may comprise a current control mode power converter to generate a switching current signal, the current control mode power converter comprising a capacitor. The present example embodiment may further comprise a current sampling unit to sample the switching current signal at the capacitor, the current sampling unit to generate a digitized waveform for the sampled signal. The example embodiment may also comprise a computation unit to estimate a remaining life of the current control mode power converter based at least in part on the sampled waveform.

Another example embodiment may comprise a technique for estimating remaining power converter life including sampling, utilizing a sampling circuit, a signal from a power converter, the power converter including a capacitor, and generating a digitized waveform for the sampled signal. The technique may also include estimating a remaining life of the power converter based at least in part on the digitized waveform.

In another embodiment, an article may comprise a storage medium having stored thereon instructions executable by a computing platform to sample a signal from a power converter, the power converter including a capacitor, the instructions further executable by the computing platform further to generate a digitized waveform for the sampled signal and estimate a remaining life of the power converter based at least in part on the digitized waveform.

An additional example embodiment may comprise an apparatus to digitize a repetitive signal having a time cycle, wherein the apparatus comprises an input terminal to accept a repetitive analog electrical signal from a power converter. The apparatus may further include a sample and hold circuit having a switch coupled to the input terminal to periodically sample the repetitive analog electrical signal according to a sampling time, and may also include a capacitor coupled to an output terminal of the sample and hold circuit to maintain a voltage from the sampled analog electrical signal. For this example embodiment, an analog-to-digital converter may be coupled to the capacitor to generate a set of digital information signals according to the voltage from the sampled analog electrical signal. A computation unit may receive the set of digital information signals and may store said digital information signals in a memory, said computation unit to estimate a remaining life of a power converter based at least in part on the set of digital information signals. The embodiment may further comprise a trigger unit to trigger the sample and hold circuit at least in part in response to receiving a command from the computation unit.

Of course, the embodiments described above are merely example embodiments, and the scope of claimed subject matter is not limited in these respects. Additional embodiments are described below, and again the embodiments described are examples. The scope of claimed subject matter is not limited to the particular examples described herein.

Figure 1:
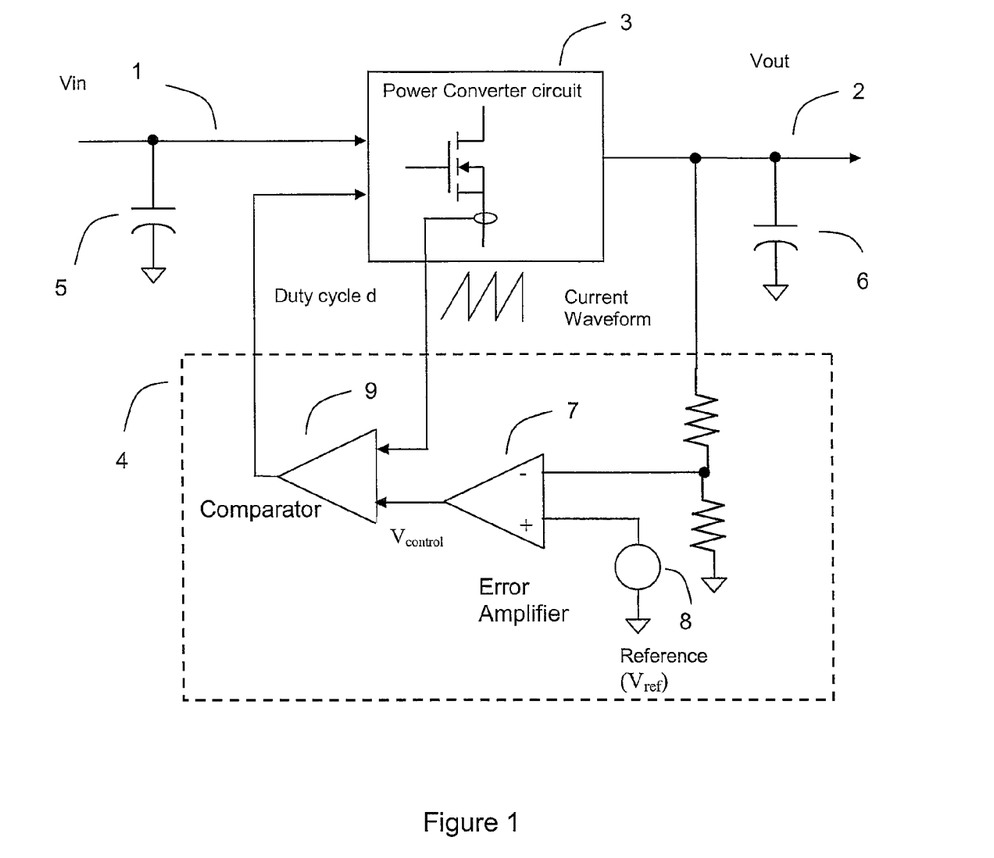
FIG. 1 is diagram of an example current mode controlled power converter system.

FIG. 1 is diagram of a conventional current mode controlled power converter system. This example switching power converter comprises an input 1, at least one output 2, a power converter circuit 3 and a control unit 4. The example embodiment may further comprise at least one input capacitor 5 and at least one output capacitor 6. These capacitors are, for one or more embodiments, electrolytic type capacitors which may determine the lifetime of the power converter. The power converter circuit comprises semiconductor switches which operate a converter circuit 3. The control unit comprises an error amplifier 7. An error amplifier 7 picks up a signal from the output which may be the converter output voltage or the converter output current depending on the parameter to be controlled. In response to an internal reference signal 8 the error amplifier 7 produces a control signal. There is also means to pick up the current through the semiconductor switch for control purposes. In general a current sensing resistor picks up the switching current waveform signal. This current signal is coupled to a comparator 9 which compares the current signal with the control signal from the error amplifier 7. In response, the comparator 9 produces a pulse width modulated signal with a duty cycle that controls the semiconductor switches. This type of power converter configuration may be referred to as Current Mode Control. This configuration is very popular in the field because the control loop can be stabilized easily and it enables the converter to have good dynamic performance.

Figure 2:
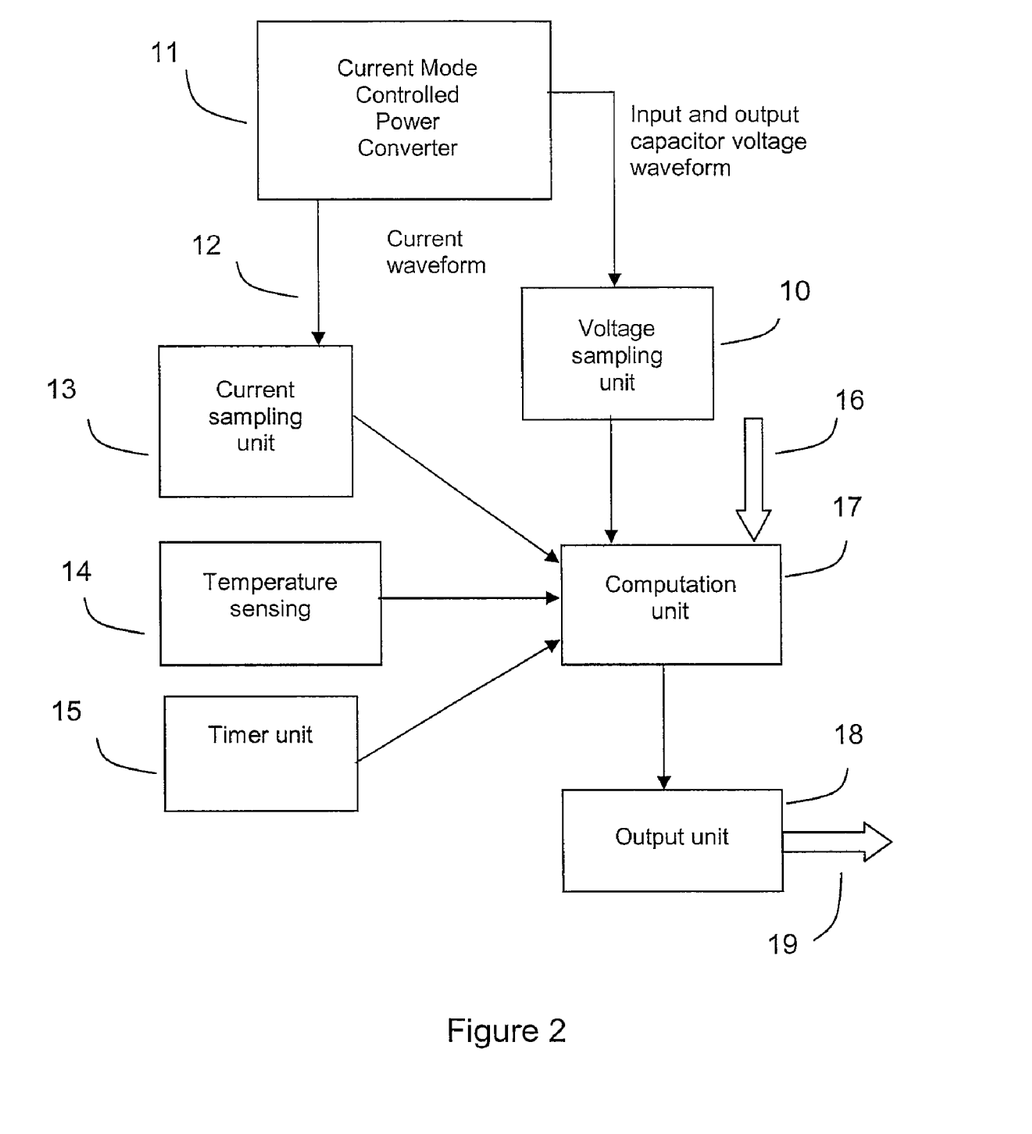
FIG. 2 is a block diagram of an example embodiment of a power converter lifetime estimator.

One or more embodiments may make use of the Current Mode Control converter and the apparatus described herein to predict the power converter remaining life and reliability. An embodiment in accordance with claimed subject matter is shown in FIG. 2. This embodiment comprises a power converter, the reliability and life of which is to be monitored and reported. In general, the power converter has electrolytic capacitors installed at its input terminals and output terminals. The life time of these electrolytic capacitors may largely determine the life time of the power converter. It is a Current Mode Control type power converter 11 where the switching current waveform 12 signal is readily available at the controller without an extra sensor. The current waveform signal is captured by a current sampling unit 13. This current sampling unit turns the current waveform information into a digital format. The input and output capacitor ripple voltage waveforms are captured by a voltage sampling unit 10. The information is collected by a computation unit 17 for calculation of the reliability of the power converter. This embodiment further comprises a temperature sensing unit 14. It comprises a temperature sensor and means to convert the temperature information into a digital format made available to the computation unit 17. This embodiment further comprises a timer unit to record converter operation time. In an embodiment this timer is a long interval timer which counts for several thousand hours. It may comprise a slow timer which triggers the computation unit to update an internal register which represents operation time. There is also means to program the power converter parameters into the computation unit for accurate remaining lifetime prediction. Such information includes the type of electrolytic capacitor used in the power converter, operating voltage, converter type and other information. The computation unit 17 collects data from the current sampling unit 13, the temperature sensing unit 14, the timer unit 15 and preprogrammed data on the power converter. It calculates the estimated remaining life of the converter and presents the result to an output unit 18. The output unit 18 presents the remaining lifetime of the converter by an electrical signal 19. This signal is presented in the form of a pulse having a duty cycle between 0 and 1. This duty cycle represents the portion of the lifetime that remains. For example, at the beginning, the duty cycle may be 1 and it may decay with converter operation time according to computation algorithm described herein. The output signal 19 can have other formats. For example it can be an analog signal with a voltage between two levels while the remaining converter life portion is represented by a signal level in between.

Figure 3:
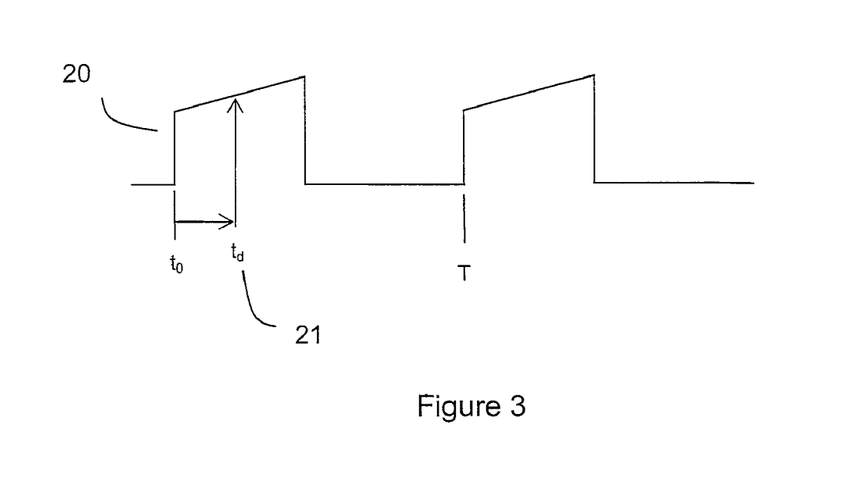
FIG. 3 is an illustration of an example current signal.

The current sampling unit 13 captures the power converter switching waveform and digitizes the information for presentation to the computation unit 17. In general the current waveform 20 is trapezoidal or triangular in shape as shown in FIG. 3. The frequency of this waveform may be relatively high, on the order of a few hundred KHz. A high speed analogue to digital converter (A/D converter) may be utilized to digitize this waveform. However, a high speed A/D converter may be relatively expensive. A low cost, lower speed A/D converter may be utilized for one or more embodiments. One or more embodiments may make use of the repetitive nature of the waveform in order to be able to use the low cost A/D converter. The principle is shown in FIG. 3. A repetitive sample is taken at a time $t_d$ from the start of a switching cycle. Multiple samples are taken in order to average out noise effects. The signal may be digitized by an A/D converter and the data may be stored in a memory in the computation unit. In response to completion of the conversion process, $t_d$ may be incremented to a next sample point. The delay time $t_d$ sweeps through the whole cycle from $t_0$ to T and a complete cycle of the waveform can be captured. This technique makes use of the repetitive nature of the signal to be sampled in order to accommodate slow sample and hold devices and A/D converters.

Figure 4:
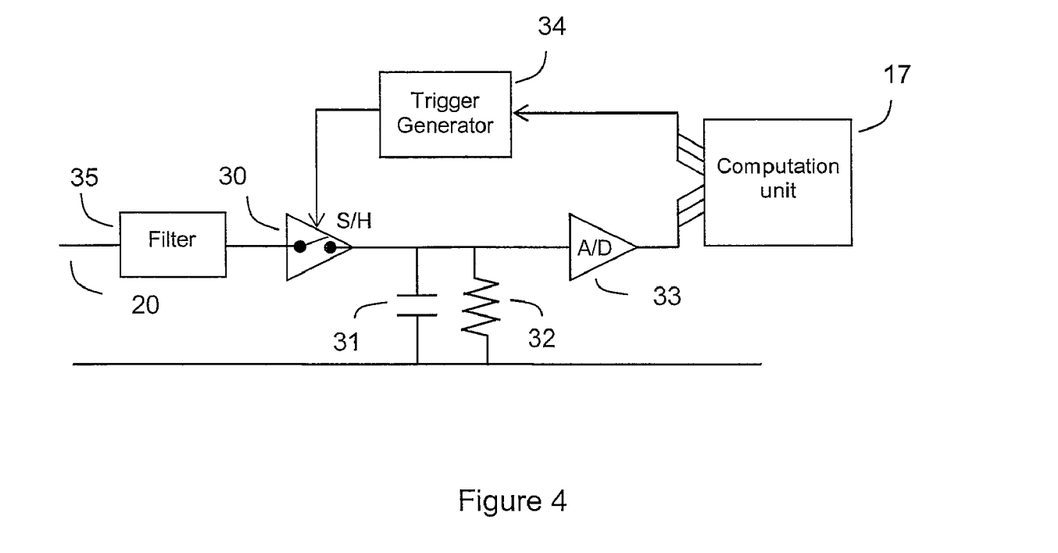
FIG. 4 is a diagram of example embodiment of repetitive signal capture circuitry.

An example embodiment of a current sampling unit is shown in FIG. 4 and described herein. Current waveform 20 is passed through a filter 35 which removes high frequency noise. The signal is presented to a sample and hold circuit 30. Circuit 30 comprises a capacitor 31 and a discharge resistor 32. The sampled signal is presented to an A/D converter 33 which in turn feeds the digitized data to the computation unit 17. Sample and hold circuit 30 may be triggered by a trigger generator 34 which may be synchronized with current waveform 20. In response to a completion of data capture, the computation unit increments the time $t_d$ for the trigger generator. Computation unit 17 controls sampling through the whole cycle and captures a digitized waveform of the whole cycle. This example embodiment of a current sampling unit may be incorporated into an integrated circuit or any other package.

Computation unit 17 gathers data from the various units and predicts the remaining power converter life. Initially, unit 17 receives the digitized current waveform from the current sampling unit and calculates the capacitor currents in the input capacitor 5 and output capacitor 6 according to the algorithm described herein. For some embodiments, there are three basic power converter topologies, namely the buck, boost, and buck-boost converter topologies. Input and output capacitor currents may be computed from the current waveform of the semiconductor switch.

Figure 5A:
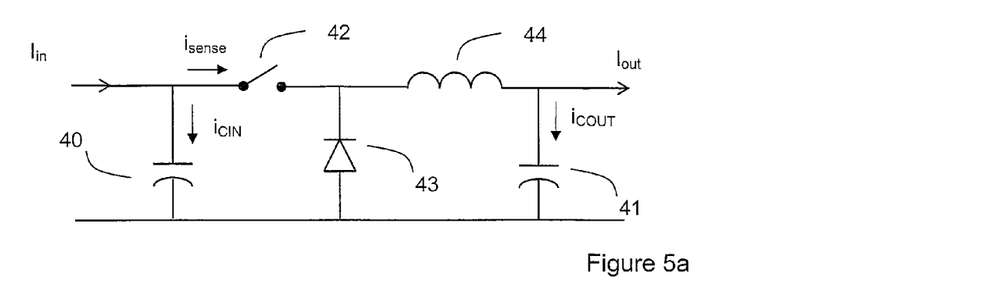
FIG. 5a is a schematic diagram of an example embodiment of a buck power converter.
Figure 5B:
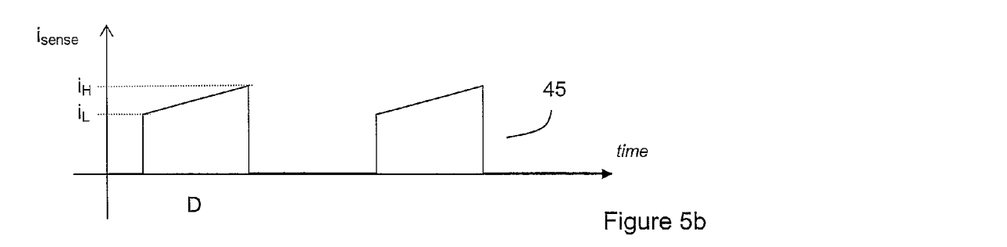
FIG. 5b is a waveform of an example signal to be sensed.
Figure 5C:
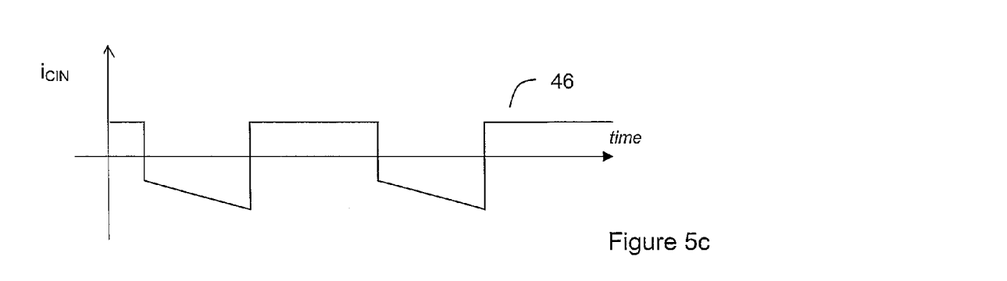
FIG. 5c is an example waveform depicting input capacitor current.

FIG. 5a illustrates an example embodiment of a buck converter comprising an input capacitor 40 and an output capacitor 41. The converter may further comprise a semiconductor switch 42, a diode 43, and an inductor 44. It is assumed that the input current $I_{in}$ and output current $I_{out}$ of the converter are constant. The switching current is absorbed at least in part by the input capacitor and the output capacitor. FIG. 5b illustrates the current $i_{sense}$ through the switch 42. The current through the input capacitor has the same waveform as $i_{sense}$ except that the waveform 46 is balanced about the time axis as shown in FIG. 5c. The duty cycle for this embodiment is labeled "D". The r.m.s. ripple current $i_{CIN}$ is represented in terms of $i_{sense}$ in the following equation:

$$i_{CIN} = \sqrt{\frac{(i_L^2 + i_H^2)(4D^2 + 7D + 4) + i_L i_H(-8D^2 + 2D + 4)}{12(2D-1)^2}D} \quad (1)$$

wherein $i_L$ represents the switch "turn on" current, and wherein $i_H$ represents the switch "turn off" current.

Figure 5D:
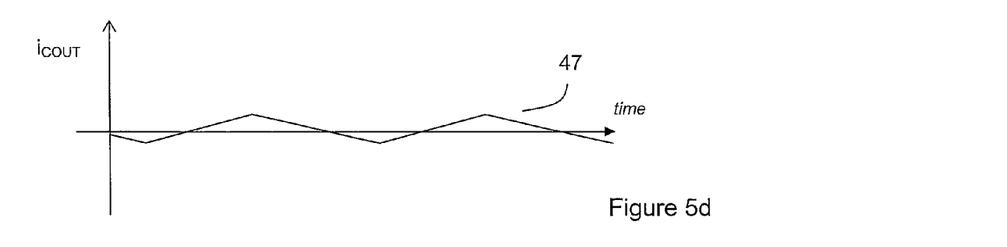
FIG. 5d is an example waveform illustrating output capacitor current.

FIG. 5d illustrates the current through the output capacitor for an embodiment. The r.m.s. ripple current $i_{COUT}$ may be represented in terms of $i_{sense}$ in the following equation:

$$i_{COUT} = \sqrt{\frac{(i_H - i_L)^2}{12}} \quad (2)$$

The buck converter is one possible topology, for an embodiment. It may be extended to a forward converter or other converters which provide isolation between the input and output by a transformer. Topological variations are possible for a variety of embodiments, and the techniques described herein may be applied accordingly.

Figure 6A:
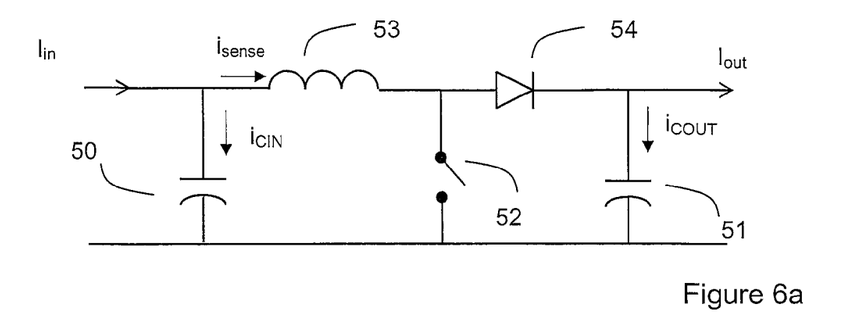
FIG. 6a is a schematic diagram of an example embodiment of a boost power converter.
Figure 6B:
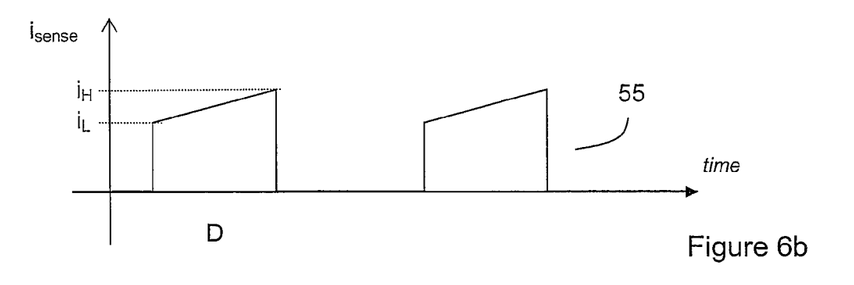
FIG. 6b is a waveform of an example signal to be sensed.
Figure 6C:
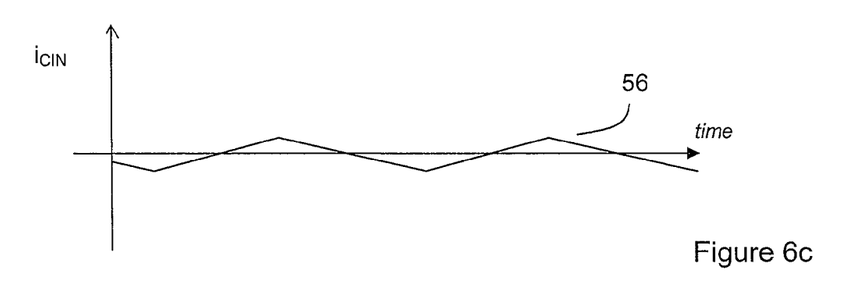
FIG. 6c is an example waveform depicting input capacitor current.

FIG. 6a depicts an example embodiment of a boost converter. The boost converter may comprise an input capacitor 50 and an output capacitor 51. The converter may further comprise a semiconductor switch 52, an inductor 53, and a diode 54. It is assumed for this example that the input current $I_{in}$ and output current $I_{out}$ of the converter are constant. The switching current is absorbed at least in part by the input capacitor and the output capacitor. FIG. 6b depicts the current $i_{sense}$ through the switch 52. The current through the input capacitor picks up the ripple current of $i_{sense}$ as shown in FIG. 6c. The r.m.s. ripple current $i_{CIN}$ may be represented in terms of $i_{sense}$ in the following equation:

$$i_{CIN} = \sqrt{\frac{(i_H - i_L)^2}{12}} \quad (3)$$

Figure 6D:
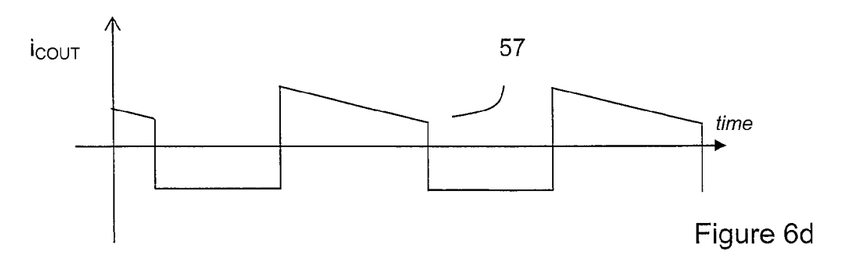
FIG. 6d is an example waveform of output capacitor current.

FIG. 6d depicts the current through output capacitor 51. The ripple current $i_{COUT}$ has the same waveform as $i_{sense}$ except that the waveform 57 is balanced about the time axis, for this example. The r.m.s. ripple current $i_{COUT}$ may be represented in terms of $i_{sense}$ in the following equation:

$$i_{COUT} = \sqrt{\frac{(i_L^2 + i_H^2)(-3D^3 + 7D^2 - 9D + 5) + i_L i_H(-6D^3 + 14D^2 - 14D + 6)}{12}} \quad (4)$$

The boost converter is an example topology. It may be extended to converters with isolation between the input and output by a transformer or other means. Topological variations are possible for one or more alternate embodiments, and the example techniques described herein may be applied accordingly.

Figure 7A:
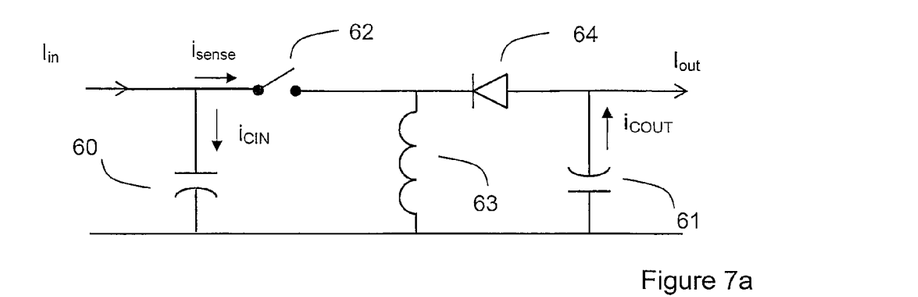
FIG. 7a is a schematic diagram of an example embodiment of a buck boost power converter.
Figure 7B:
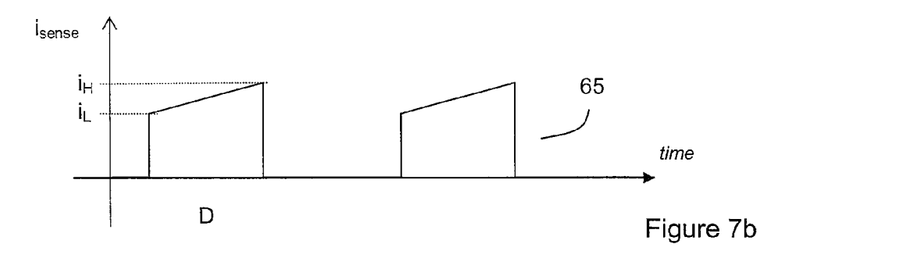
FIG. 7b is an example waveform of a signal to be sensed.
Figure 7C:
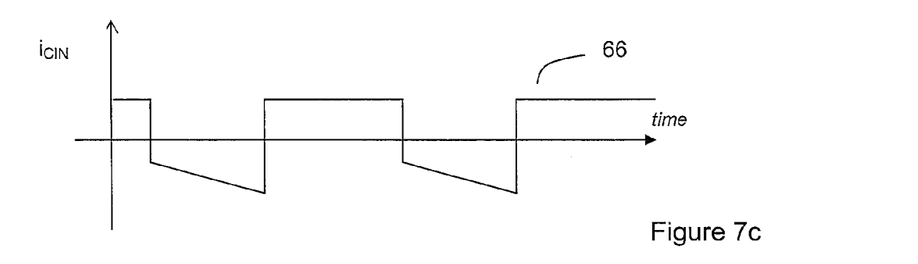
FIG. 7c is an example waveform illustrating input capacitor current.

FIG. 7a illustrates an example embodiment of a buck-boost converter. The converter may comprise an input capacitor 60 and an output capacitor 61. The converter may further comprise a semiconductor switch 62, an inductor 63, and a diode 64. It is assumed for this example that the input current $I_{in}$ and output current $I_{out}$ of the converter are constant. The switching current may be absorbed at least in part by the input capacitor and the output capacitor. FIG. 7b depicts the current $i_{sense}$ through the switch 62. The current through the input capacitor may pick up the ripple current of $i_{sense}$ as illustrated in FIG. 7c. The r.m.s. ripple current $i_{CIN}$ for an embodiment may be represented in terms of $i_{sense}$ in the following equation:

$$i_{CIN} = \sqrt{\frac{(i_L^2 + i_H^2)(4D^3 + 7D^2 + 4D) + i_L i_H(-8D^3 + 2D^3 + 4D)}{12(2D-1)^2}} \quad (5)$$

Figure 7D:
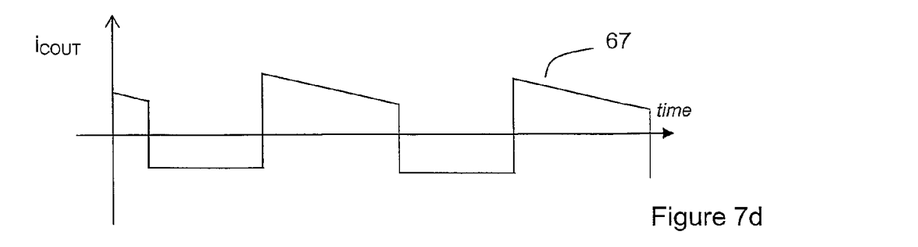
FIG. 7d is an example waveform depicting output capacitor current.

FIG. 7d depicts the current through the output capacitor for this example. The ripple current $i_{COUT}$ may be represented for this example in terms of $i_{sense}$ in the following equation:

$$i_{COUT} = \sqrt{\frac{(i_L^2 + i_H^2)(-3D^3 + 7D^2 - 9D + 5) + i_L i_H(-6D^3 + 14D^2 - 14D + 6)}{12}} \quad (6)$$

The buck-boost converter is an example topology. It may be extended to converters with isolation between the input and output by a transformer, such as, for one example, a flyback converter. There may be topological variations for other embodiments, and the techniques described herein may be applied accordingly.

For one or more embodiments, an aluminum electrolytic capacitor may be a component which may at least in part determine the lifetime of a power converter. A possible cause of failure for an aluminum electrolytic capacitor may be a drying-out of electrolyte. This may also be referred to as 'wear-out failure' which may result in a reduction in capacitance. Aluminum electrolytic capacitors may comprise liquid electrolyte. The electrolyte may exhibit rather conspicuous temperature characteristics, and the thermal stress may have an effect on the capacitor's life expectancy. Dissipation heat generated by the ripple current may be a factor affecting the useful life of the capacitor. For one or more embodiments, the maximum permissible ripple current value may depend on the ambient temperature. Operating temperature and ripple current rating may be sources of wear-out mechanisms. An increase in ambient temperature or in internal temperature rise caused by ripple current may accelerate the evaporation of the electrolyte. The electrolyte vapor may escape through the rubber packing and the electrolyte volume left is reduced. Etch tunnels of the capacitor may no longer be fully filled with electrolyte and thus the effective surface area of the electrode reduces. This causes the capacitance to be decreased, and the equivalent series resistance (ESR) may increase due at least in part to the electrolytic resistance.

The equivalent series resistance (ESR) may be computed. The ripple currents in the input capacitor and the output capacitor may be captured as described. The capacitor ripple voltage waveform may also be captured by a sampling unit the same as that described in FIG. 4. Having obtained the current waveform and the voltage waveform of the capacitors, the computation unit 17 may calculate the ESR using the well-known Ohm's law. The ESR in an electrolytic capacitor grows as the capacitor deteriorates, and as such may provide a good indicator of the capacitor's remaining life.

For one or more embodiments, the lifetime of a capacitor may be estimated from the following equation:

$$L = L_b \cdot 2^{\frac{T_{max}-T_a}{10}} \cdot 2^{\left(\frac{\Delta T_s}{A_o} - \frac{\Delta T_j}{A}\right)} \quad (7)$$

wherein:
L represents the actual life;
$L_b$ represents the base life at rated conditions;
$T_{max}$ represents the rated temperature;
$T_a$ represents the ambient temperature;
$\Delta T_s$ represents the rated heat rise at the core of the capacitor by rated current ripple;
$A_0$ represents the temperature factor for a rated heat rise;
$\Delta T_j$ represents the actual heat rise at the core of the capacitor by operating current ripple; and
A represents the temperature factor for actual heat rise.

The two multipliers, for one or more embodiments, may represent an ambient temperature factor and a capacitor core temperature factor. The two temperature factors' effect may be expressed by an Arrhenius relation, for an embodiment. Because the core temperature heat may be generated from ripple currents, it is possible to rewrite the second multiplier in terms of current ripple rating with the given relationship:

$$\Delta T_j = \Delta T_s \cdot \left(\frac{I}{I_o}\right)^2 \quad (8)$$

where I represents the ripple current rms and $I_o$ represents the rated ripple current. I represents the capacitor ripple current which is estimated by the techniques described herein for the various converter topologies.

Figure 8:
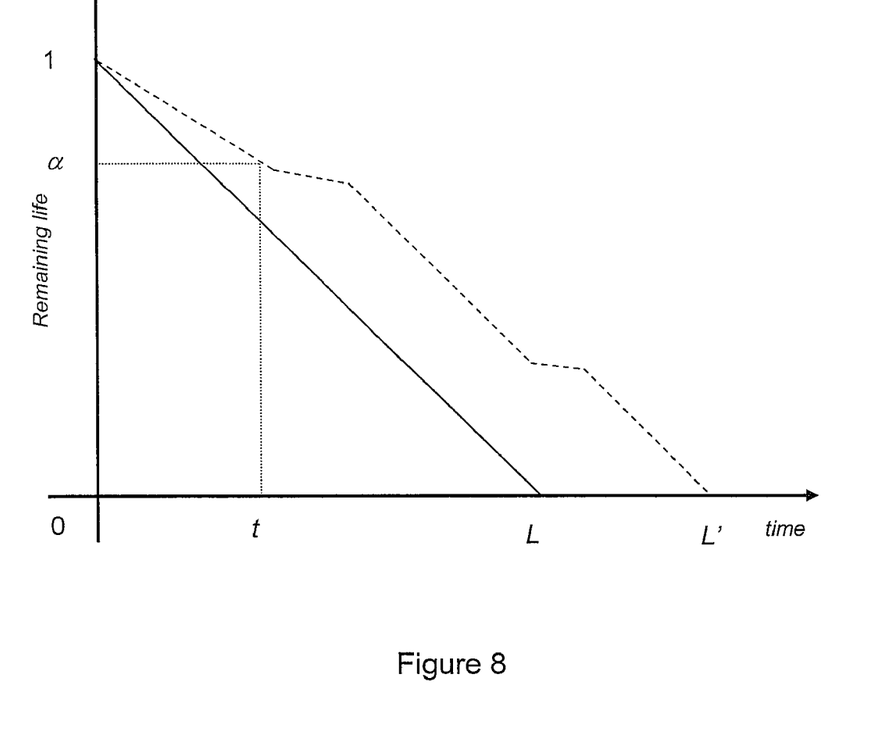
FIG. 8 is a graph demonstrating deterioration of remaining power converter life over time.

In FIG. 8 the life of an example capacitor is plotted against time. The estimated remaining life is expressed in terms of a factor between 1 and 0 for this example embodiment. The factor starts with a value 1 and decays to 0 over time for this example, with the estimated lifetime L defined by example equation (7), above. The rate at which capacitor life decays may be given by the slope of curve, which is $$m = \frac{1}{L} \quad (9)$$

Slope m may be modified by factors that may affect L such as ambient temperature $T_a$ and ripple current I.

The decrement in estimated remaining life percentage for an operating period t for an example embodiment may be expressed as:

$$\frac{mt}{L} \cdot 100\% = \frac{t}{L^2} \cdot 100\% \quad (10)$$

wherein t represents a time period of one data refresh cycle.

Actual lifetime L' can be affected by different operating conditions throughout the life of the capacitor. After cumulative time t the remaining life corresponds to a factor α that indicates the estimated remaining life where $$\alpha = 1 - \sum_{i=1,2...}^{n} \frac{t_i}{L_i^2} \quad (11)$$

Computation unit 17 may have stored therein information related to the converter. The information may comprise the type of power converter being used as well as parameters of the capacitor, for one or more embodiments. The capacitor parameters for an example embodiment may comprise the factor $L_b$, the rated maximum temperature $T_{max}$, the rated ripple current $I_o$, $\Delta T_s$, A and/or $A_o$ which may be available from the capacitor manufacturer or by measurement. The information may further comprise the ambient temperature of the capacitor environment $T_a$ as received from temperature sensing unit 14, and may also comprise the operation time from timer unit 15. Computation unit 17 may compute α using the above-mentioned information for an example embodiment. However, the types of information mentioned are merely examples, and the scope of claimed subject matter is not limited in this respect.

For embodiments incorporating power converters with an input capacitor and an output capacitor, the estimated remaining life of each capacitor may be computed separately. The smaller estimated remaining life value may be presented as the estimated remaining life of the power converter.

Figure 9:
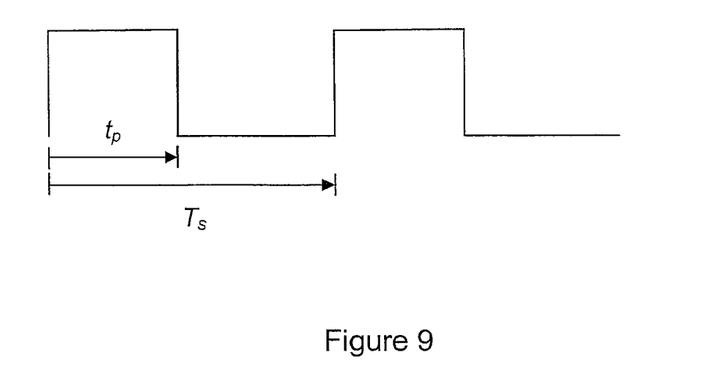
FIG. 9 is a diagram illustrating an example technique for estimating remaining power converter life.

For an embodiment, output unit 18 receives factor α from the computation unit and turns the information into an electrical signal 19 for presentation to the outside world. For an example embodiment, factor α may be represented as the duty cycle of a pulse train as shown in FIG. 9 where $$\frac{t_p}{T_s} = \alpha \quad (12)$$

wherein $t_p$ represents a period of time during which a signal representing a remaining life is at a logically high value, for this example embodiment.

If the duty cycle of the pulse train represents factor α, the frequency of the pulse may also present useful information on the power converter. The pulse frequency can represent capacitor environment temperature $T_a$, for an example embodiment. If there is an abnormal rise in temperature say due to deterioration or failure of the system cooling fan, the pulse frequency may be designed to change significantly, thus serving as a signal that the power converter requires immediate repair. For other embodiment, the frequency of the pulse train may represent any of a range of information that may be advantageous.

Although embodiments described herein mention a pulse train to communicate estimated remaining life of a power converter, other embodiments are possible using other signal types. For example, in an embodiment the estimated remaining life may be represented by an analog signal that varies in voltage level according to the estimated remaining life.

It will be obvious to those having ordinary skill in the art that there are many ways to present the factor α in the form of an electrical signal without departing from the scope of claimed subject matter.

One or more embodiments, such as those described herein, may be implemented by a microprocessor system. The microprocessor system may comprise the units depicted in FIG. 2, for example, including, but not limited to, the power converter 11 with means to capture current information, current sampling unit 13, temperature sensing unit 14, timer unit 15, computation unit 17 and/or output unit 18. Any combination or a selected set of the units described herein may be integrated into an integrated circuit for one or more embodiments. Also, for one or more embodiments, the computation speed may not be an important consideration, and the system may be designed for low cost.

Figure 10:
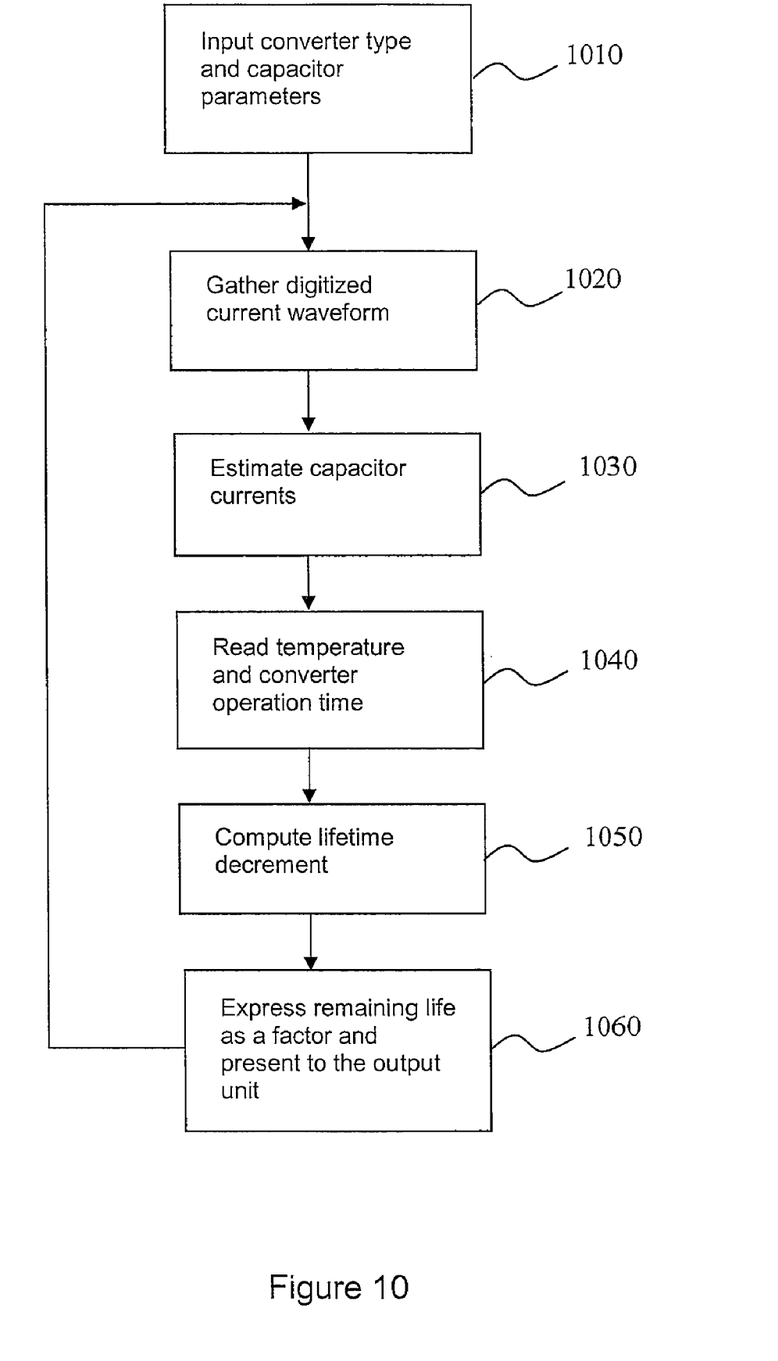
FIG. 10 is a flow chart of an example embodiment of a method for estimating remaining power converter life.

FIG. 10 is a flow diagram of an example embodiment of a method for estimated the remaining life of a power converter. At block 1010, information related to the power converter may be programmed into a computation unit, for example. For an example embodiment, one possible type of information may include the converter type, which may be one of the three basic converter topologies discussed above or others. Setting the converter type allows appropriate equations to be used to estimate the capacitor currents. The parameters related to the capacitor shown in equations (7) and (8) may be gathered and also provided to the calculation unit, for an example embodiment. At block 1020, a digitized waveform of the semiconductor current may be gathered. For an embodiment, the example embodiments described in connection with FIG. 3 may be utilized. At block 1030, an appropriate equation may be selected from among equations (1) to (6) or others according to the type of power converter identified, and the estimated capacitor current may be calculated. At block 1040, the capacitor temperature and the converter operation time may be determined. The capacitor lifetime decrement may be calculated, for an embodiment, according to equation (10) at block 1050. At block 1060, the estimated remaining lifetime may be presented as a factor α according to equation (11). This factor may be made available to the outside world for real-time monitoring. The example process described above may repeat any number of times, and may provide real-time monitoring of the power converter. Embodiments in accordance with claimed subject matter may include all, less than, or more than blocks 1010-1060. Also, the order of blocks 1010-1060 are merely an example order, and the scope of claimed subject matter is not limited in this respect.

Figure 11:
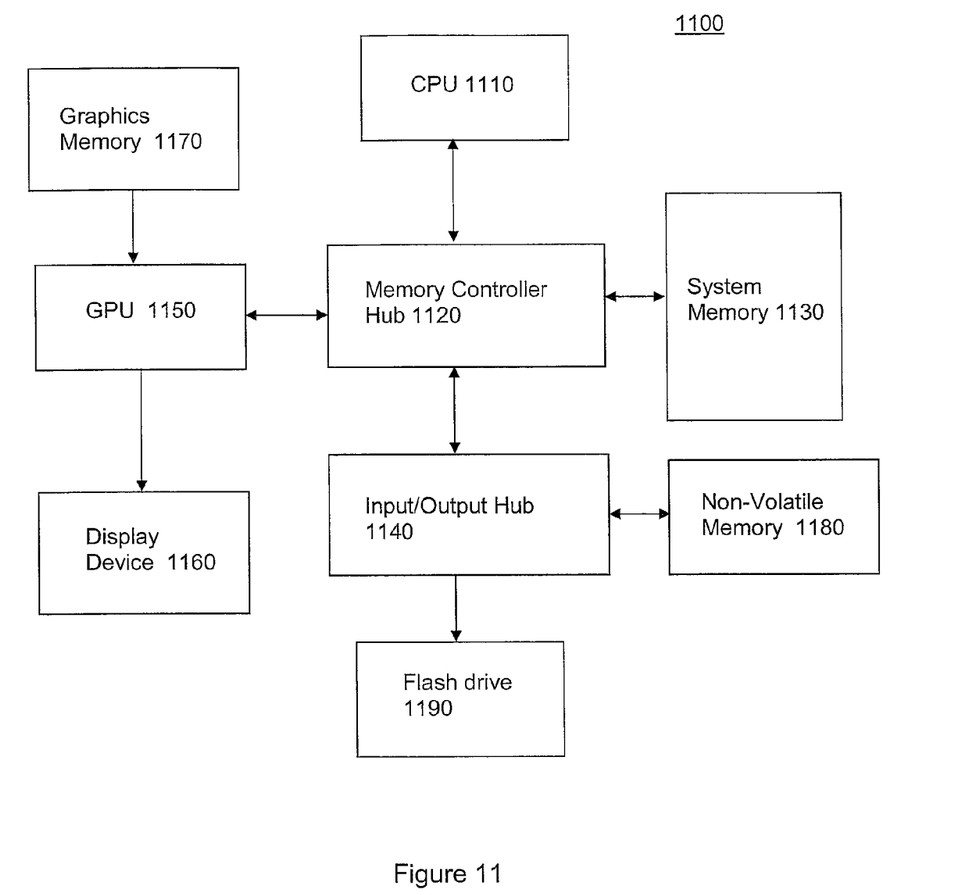
FIG. 11 is a block diagram of an example embodiment of a computing platform.

FIG. 11 is a block diagram of an example embodiment of a computing platform 1100. Computing platform 1100 merely represents one possible computing platform configuration that may be used to implement some or all of the techniques described herein, and the scope of claimed subject matter is not limited in this respect. Computing platform 1100 may comprise a central processing unit (CPU) 1110 and a memory controller hub 1120 coupled to CPU 1110. Memory controller hub 1120 is further coupled to a system memory 1130, to a graphics processing unit (GPU) 1150, and to an input/output hub 1140. GPU 1150 is further coupled to a display device 1160, which may comprise a CRT display, a flat panel LCD display, or other type of display device. Also coupled to GPU 1150 is a graphics memory 1170. For this example embodiment, graphics memory 1170 may be coupled to GPU 1150 via a parallel data interface or interconnect, and input/output hub 1140 may be coupled to memory controller hub 1120 via a serial data interface or interconnect.

Further, for the example embodiment depicted in FIG. 11, input/output hub 1140 may be coupled to non-volatile memory 1180, and may further be coupled to flash drive 1190, which, for the embodiment depicted in FIG. 11, may comprise a USB Flash drive inserted into a USB port in system 1100 (not shown).

System memory 230 may, for an embodiment, have stored thereon instructions, that, if executed by CPU 1110 may enable the computing platform to perform at least in part one or more aspects of power converter remaining life estimation operations as described herein, although the scope of claimed subject matter is not limited in this respect. Computing platform 1100 may also comprise, for one or more embodiments, one or more power converters (not shown) that may be monitored in accordance with embodiments described herein. Of course, system 1100 is merely an example type of electronic device that may implement one or more embodiments described herein, and the scope of claimed subject matter is not limited to any particular device type.

A computing platform refers to a system or a device that includes the ability to process or store data in the form of signals. Thus, a computing platform, in this context, may comprise hardware, software, firmware or any combination thereof. For one or more embodiments, a computing platform may comprise any of a wide range of digital electronic devices, including, but not limited to, personal desktop or notebook computers, high-definition televisions, digital versatile disc (DVD) players or recorders, game consoles, satellite television receivers, cellular telephones, personal digital assistants, mobile audio or video playback or recording devices, and so on. Further, unless specifically stated otherwise, a process as described herein, with reference to flow diagrams or otherwise, may also be executed or controlled, in whole or in part, by a computing platform.

Figure 12:
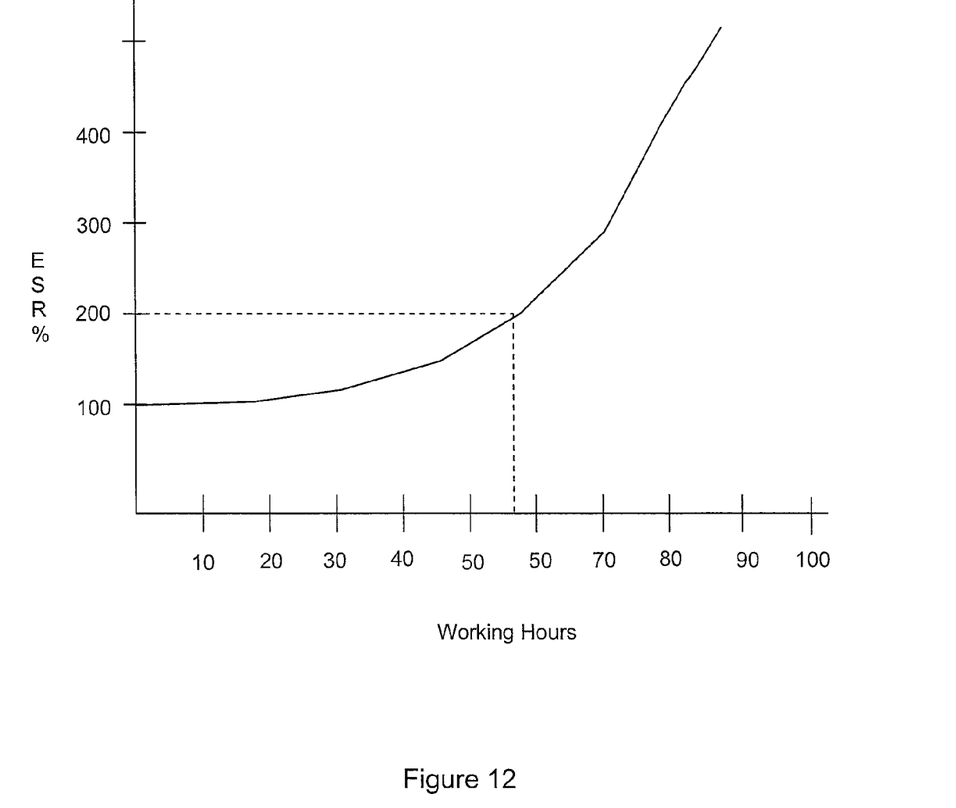
FIG. 12 is a diagram depicting example test results.

FIG. 12 is a diagram depicting example test results for an embodiment. Test results for this example are based on an example embodiment of power convert. For this example embodiment, the converter comprises a discontinuous conduction mode flyback converter. In an embodiment, the flyback converter may comprise a converter similar to a buck-boost converter such as that described above in connection with FIG. 7a, but with the inductor split to form a transformer. Of course, the flyback converter is merely an example type of power converter, and the scope of claimed subject matter is not limited in this respect. Similarly, the buck converter, boost converter, and buck-boost converters are also merely example types of power converters, and again the scope of claimed subject matter is not limited in these respects.

As mentioned, the example test results of FIG. 12 are based on an example embodiment of a discontinuous conduction mode flyback converter. For this example embodiment, the output signal of the flyback converter is 12V at 7A. The working temperature of the output capacitor of the flyback converter is assumed to be 25° C. The output capacitor ripple current for this example is assumed to be 12.76 A rms. For this example embodiment of the flyback converter, the output capacitor comprises a Rubycon ZL series capacitor rated at 35V and 1800 μF. The initial ESR of the output capacitor is assumed to be 15.6 mΩ at 25° C. and 100 kHz. Also, the calculated rated ESR is assumed to be 11.8 mΩ at 105° C. and 100 kHz. Of course, this is merely an example capacitor, and the scope of claimed subject matter is not limited in these respects.

As depicted in FIG. 12, the y-axis represents an ESR percentage for the output capacitor based on an initial ESR measurement, and the x-axis represents working hours for the power converter. For the present example, the power converter end of life is assumed to occur at the point where the output capacitor ESR reaches 200% of the capacitor's initial ESR. For the present example power converter embodiment, the point at which the output capacitor's ESR is estimated to reach the 200% level is calculated to be 46.96 hrs. According to the test results for this example, and as depicted in FIG. 12, the point at which the output capacitor ESR percentage reaches the 200% level is measured to be 56 hrs. For this example test result, an error of 16% between the measured test results and the calculated predicted result is observed. For an example embodiment, an acceptable error range may comprise 40%, although the scope of claimed subject matter is not limited in these respects.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

Unless specifically stated otherwise, as apparent from the discussion herein, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "determining" or the like refer to the actions or processes that may be performed by a computing platform, such as a computer or a similar electronic computing device, that manipulates or transforms data represented as physical, electronic or magnetic quantities or other physical quantities within the computing platform's processors, memories, registers, or other information storage, transmission, reception or display devices.

In the preceding description, various aspects of claimed subject matter have been described. For purposes of explanation, systems or configurations were set forth to provide an understanding of claimed subject matter. However, claimed subject matter may be practiced without those specific details. In other instances, well-known features were omitted or simplified so as not to obscure claimed subject matter. While certain features have been illustrated or described herein, many modifications, substitutions, changes or equivalents will now occur to those skilled in the art. It is, therefore, to be understood that the appended claims are intended to cover all such modifications or changes as fall within the true spirit of claimed subject matter.

The invention claimed is:

1. An apparatus, comprising:
a current control mode power converter to generate a switching current signal, said current control mode power converter comprising a capacitor;
a current sampling unit to sample the switching current signal at the capacitor, the current sampling unit to generate a digitized waveform for the sampled signal;
a computation unit to estimate a remaining life of the current control mode power converter based at least in part on the sampled waveform; and
an output unit to receive an output signal from the computation unit and to generate an analog signal representing the estimated remaining life of the current control mode power converter.

2. The apparatus of claim 1, further comprising a voltage sampling unit, wherein the capacitor of the current control mode power converter comprises an input capacitor, the voltage sampling unit to sample a ripple voltage at the input capacitor.

3. The apparatus of claim 1, further comprising a voltage sampling unit, wherein the capacitor of the current control mode power converter comprises an output capacitor, the voltage sampling unit to sample a ripple voltage at the output capacitor.

4. The apparatus of claim 1, further comprising a temperature sensing unit to sense a temperature of the capacitor, the computation unit to estimate the remaining life of the current control mode power converter based at least in part on a temperature of the capacitor.

5. The apparatus of claim 4, further comprising a timer unit to track power converter operation time, the computation unit to estimate the remaining life of the current control mode power converter based at least in part on the power converter operation time.

6. The apparatus of claim 5, the computation unit further to estimate the remaining life of the current control mode power converter based, at least in part, on information related to the capacitor.

7. The apparatus of claim 6, the computation unit to calculate a current for the capacitor, and the computation unit to estimate the remaining life of the current control mode power converter based at least in part on the calculated capacitor current.

8. The apparatus of claim 7, the computation unit to estimate the remaining life of the current control mode power converter using one or more mathematical expressions selected at least in part in response to a topology of the current control mode power converter.

9. The apparatus of claim 8, the output unit to generate a pulse train signal, the signal having a duty cycle, wherein the duty cycle represents the estimated remaining life of the current control mode power converter.

10. The apparatus of claim 9, the output unit to generate the pulse train with a frequency representing the sensed capacitor temperature.

11. A method, comprising:
sampling, utilizing a sampling circuit, a signal from a power converter, the power converter including a capacitor;
generating a digitized waveform for the sampled signal; and
estimating a remaining life of the power converter based at least in part on the digitized waveform; and
generating an analog signal representing the estimated remaining life of the power converter.

12. The method of claim 11, further comprising sensing a temperature of the capacitor, wherein said estimating the remaining life comprises estimating the remaining life of the power converter based at least in part on the temperature of the capacitor.

13. The method of claim 12, further comprising tracking power converter operation time, wherein said estimating the remaining life comprises estimating the remaining life of the power converter based at least in part on the power converter operation time.

14. The method of claim 13, wherein said estimating the remaining life comprises estimating the remaining life of the power converter based at least in part on information related to the capacitor.

15. The method of claim 14, further comprising calculating a current for the capacitor, wherein said estimating the remaining life comprises estimating the remaining life of the power converter based at least in part on the calculated capacitor current.

16. The method of claim 15, wherein said estimating the remaining life comprises estimating the remaining life of the power converter based at least in part on one or more mathematical expressions selected at least in part in response to a topology of the power converter.

17. The method of claim 16, further comprising generating a pulse train signal, the pulse train signal having a duty cycle, wherein the duty cycle represents the estimated remaining life of the power converter.

18. The method of claim 17, wherein said generating the pulse train comprises generating the pulse train with a frequency representing the sensed capacitor temperature.

19. An article, comprising: a storage medium having stored thereon instructions executable by a computing platform to:
sample a signal from a power converter, the power converter including a capacitor;
generate a digitized waveform for the sampled signal;
estimate a remaining life of the power converter based at least in part on the digitized waveform; and
generate an analog signal representing the estimated remaining life of the power converter.

20. The article of claim 19, wherein the storage medium has stored thereon further instructions executable by the computing platform to sense a temperature of the capacitor, the computing platform to estimate the remaining life based at least in part on the temperature of the capacitor.

21. The article of claim 20, wherein the storage medium has stored thereon further instructions executable by the computing platform to track power converter operation time, the computing platform to estimate the remaining life based at least in part on the power converter operation time.

22. The article of claim 21, wherein the storage medium has stored thereon further instructions executable by the computing platform to estimate the remaining life based at least in part on information related to the capacitor.

23. The article of claim 22, wherein the storage medium has stored thereon further instructions executable by the computing platform to calculate a current for the capacitor, the computing platform to estimate the remaining life based at least in part on the calculated capacitor current.

24. The article of claim 23, wherein the storage medium has stored thereon further instructions executable by the computing platform to estimate the remaining life based at least in part on one or more mathematical expressions selected at least in part in response to a topology of the power converter.

25. The article of claim 24, wherein the storage medium has stored thereon further instructions executable by the computing platform to generate a pulse train signal, the pulse train signal having a duty cycle, wherein the duty cycle represents the estimated remaining life of the power converter.

26. The article of claim 25, wherein the storage medium has stored thereon further instructions executable by the computing platform to generate the pulse train with a frequency representing the sensed environmental temperature.

27. An apparatus to digitize a repetitive signal having a time cycle, comprising:
an input terminal to accept a repetitive analog electrical signal from a power converter;
a sample and hold circuit having a switch coupled to the input terminal to periodically sample the repetitive analog electrical signal according to a sampling time;
a capacitor coupled to an output of the sample and hold circuit to maintain a voltage from the sampled analog electrical signal;
an analog-to-digital converter coupled to the capacitor to generate a set of digital information signals according to the voltage from the sampled analog electrical signal;
a computation unit to receive the set of digital information signals and to store said digital information signals in a memory, said computation unit to estimate a remaining life of a power converter based at least in part on the set of digital information signals; and
a trigger unit to trigger the sample and hold circuit at least in part in response to receiving a command from the computation unit.

28. The apparatus of claim 27, further comprising a filter to reduce higher frequency electrical noise from the repetitive analog electrical signal.

29. The apparatus of claim 28, wherein said apparatus comprises an integrated circuit.

* * * * *